(12) United States Patent
Suzuki

(10) Patent No.: US 11,167,697 B2
(45) Date of Patent: Nov. 9, 2021

(54) CONSOLE BOX

(71) Applicant: Kojima Industries Corporation, Toyota (JP)

(72) Inventor: Takahiro Suzuki, Toyota (JP)

(73) Assignee: Kojima Industries, Aichi (JP)

( * ) Notice: Subject to any disclaimer, the term of this patent is extended or adjusted under 35 U.S.C. 154(b) by 134 days.

(21) Appl. No.: 16/432,421

(22) Filed: Jun. 5, 2019

(65) Prior Publication Data

US 2019/0375335 A1 Dec. 12, 2019

(30) Foreign Application Priority Data

Jun. 7, 2018 (JP) .............................. JP2018-109433

(51) Int. Cl.
*B60R 7/04* (2006.01)

(52) U.S. Cl.
CPC ..................................... *B60R 7/04* (2013.01)

(58) Field of Classification Search
CPC .................................. B60R 7/04; B60R 7/06
USPC ............................................ 296/24.34, 37.8
See application file for complete search history.

(56) References Cited

U.S. PATENT DOCUMENTS

| 6,616,205 B2 * | 9/2003 | Bruhnke | B60R 7/04 |
| | | | 296/37.8 |
| 6,644,526 B2 * | 11/2003 | Pegorier | B60R 7/04 |
| | | | 220/212 |

FOREIGN PATENT DOCUMENTS

JP          2006-283415 A       10/2006

* cited by examiner

*Primary Examiner* — Dennis H Pedder
(74) *Attorney, Agent, or Firm* — Bradley J. Thorson

(57) ABSTRACT

A console box configured to be installed between right and left seats may include a console body having a storage portion in which articles can be stored and a console opening through which the articles can be put in and out of the storage portion, a pair of right and left lid members configured to close the console opening of the console body, and a first hinge unit that allows the right and left lid members to be respectively independently opened and closed around an axis longitudinally passing through the console opening of the console body.

1 Claim, 8 Drawing Sheets

CONSOLE BOX

RELATED APPLICATION

The present application claims priority to Japanese Application No. 2018-109433 filed Jun. 7, 2018, which is hereby incorporated herein in its entirety by reference.

BACKGROUND

The present disclosure relates to a console box. More specifically, the present disclosure relates to a console box having a specially designed console lid that is configured to be operated in various operation modes.

Conventionally, a console box is installed between a right seat and a left seat (e.g., a driver seat and a passenger seat). The console box is composed of a console body and a console lid. The console lid is connected to the console body using hinge devices in order to open and close a console opening of the console body. Generally, the lid is configured to be used as an armrest.

Further, a console box having a specially designed console lid is known. Such a known console box is taught, for example, by Japanese Laid-Open Patent Publication No. 2006-283415 (JP2006-283415A). In the console box, the console lid is constructed as a double swing lid. That is, the console lid is separated into a pair of right and left lid members. The lid members are respectively rotatably connected to right and left longitudinal edges of right and left walls of a console body by hinge devices, so as to be independently swung (opened and closed) about longitudinal axes extending along the right and left longitudinal edges. According to the console box thus constructed, a console opening (cavity) formed in the console body can be opened and closed by half from each side.

However, in the known console box having the double swing lid, the lid members are respectively connected to the both longitudinal edges of the console body by the hinge devices. Therefore, when each of the lid members is opened, the opened lid member may stand upright on the corresponding longitudinal edge of the console body. As a result, the opened lid member may interfere with accessibility to the console opening of the console body. Further, the opened lid member may decrease viewability of interior of the console body.

Thus, there is a need in the art for an improved console box.

SUMMARY

In one aspect of the present disclosure, a console box configured to be installed between right and left seats may include a console body having a storage portion in which articles can be stored and a console opening through which the articles can be put in and taken out of the storage portion, a pair of right and left lid members configured to close the console opening of the console body, and a first hinge unit that allows the right and left lid members to be respectively independently opened and closed around an axis longitudinally passing through the console opening of the console body.

According to the aspect, for example, when the left half of the console opening of the console body is opened, the left lid member is swung (opened) inward around the axis longitudinally passing the console opening of the console body. Therefore, when the console opening of the console body is opened by half, the opened left lid member is positioned on a laterally intermediate position of the console opening of the console body. Therefore, the opened left lid member does not interfere with accessibility to the console opening of the console body. Further, the opened left lid member does not interfere with the view of the cavity of the console body.

In another aspect of the present disclosure, the console box may further include a frame-shaped member positioned between the pair of right and left lid members and the console body and configured to extend along the console opening of the console body. The pair of right and left lid members are respectively connected to the frame-shaped member via the first hinge unit so as to be opened and closed. The frame-shaped member is connected to the console body via a second hinge unit that allows the frame-shape member to be opened and closed around an axis laterally extending along the console opening of the console body.

According to the aspect, when the frame-shaped member is swung around the axis laterally extending along the console opening of the console body, the right and left lid members (the console lid) are simultaneously swung with the frame-shaped member. Therefore, the console opening of the console body can be fully opened in an easy manner.

Other objects, features and advantage of the present disclosure will be readily understood after reading the following detailed description together with the accompanying drawings and the claims.

DETAILED DESCRIPTION

Figure 1:
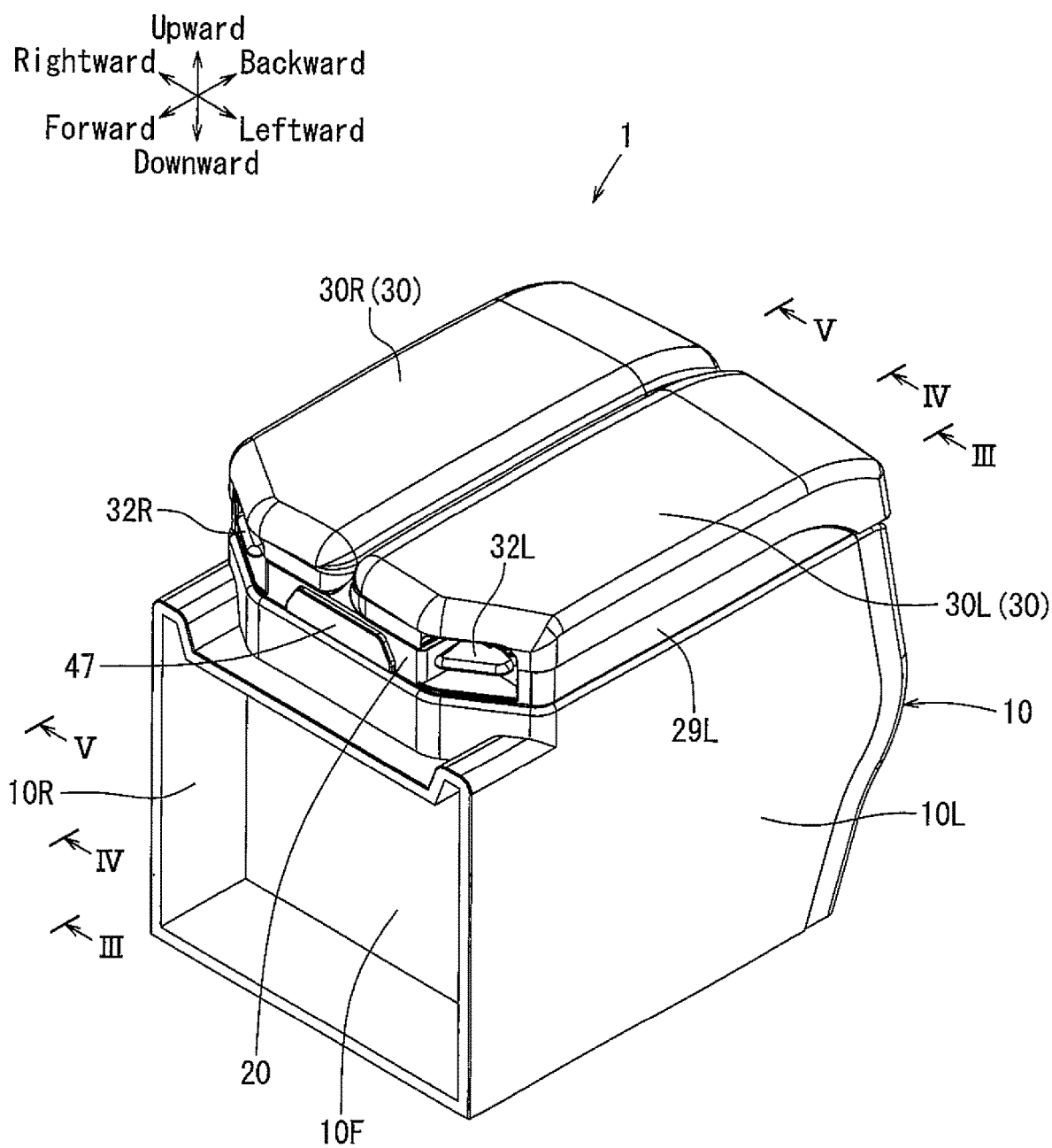
FIG. 1 is a perspective view of a console box according to a representative embodiment.

A representative embodiment will now be described in detail with reference to FIGS. 1 to 8.

A vehicular console box 1 according to the present embodiment may be configured to be disposed between a right seat and a left seat, e.g., a drivers seat (not shown) and a passenger seat (not shown), of a vehicle. Further, forward-backward, rightward-leftward, and upward-downward directions in the drawings respectively correspond to forward-backward (longitudinal), rightward-leftward (lateral), and upward-downward (vertical) directions of the vehicle.

As shown in FIGS. 1 to 5, the console box 1 may be essentially composed of an open-topped console body 10 (a main body), a lid base 20 and a console lid (door) 30. The console body 10 may preferably be formed as a rectangular parallelepiped box-shaped member. In particular, the console body 10 may have right and left longitudinal walls 10R and 10L (i.e., laterally opposite walls running in the longitudinal direction), front and back lateral walls 10F and 10B (i.e., longitudinally opposite walls running in the lateral direction) and a bottom wall 10M. The right and left walls 10R and 10L, the front and back walls 10F and 10B and the bottom wall 10M may define a rectangular parallelepiped storage portion or cavity 11 in which articles (not shown) can be stored. Further, the console body 10 may have a rectangular axisymmetrical upper edge 14 that is defined by right and left longitudinal edges 14R and 14L of the right and left walls 10R and 10L and front and back lateral edges 14F and 14B of the front and back walls 10F and 10B. Further, the console body 10 may have an upper rectangular console opening 12 defined by the upper edge 14 and configured such that the articles can be put in and taken out of the cavity 11 therethrough.

Figure 2:
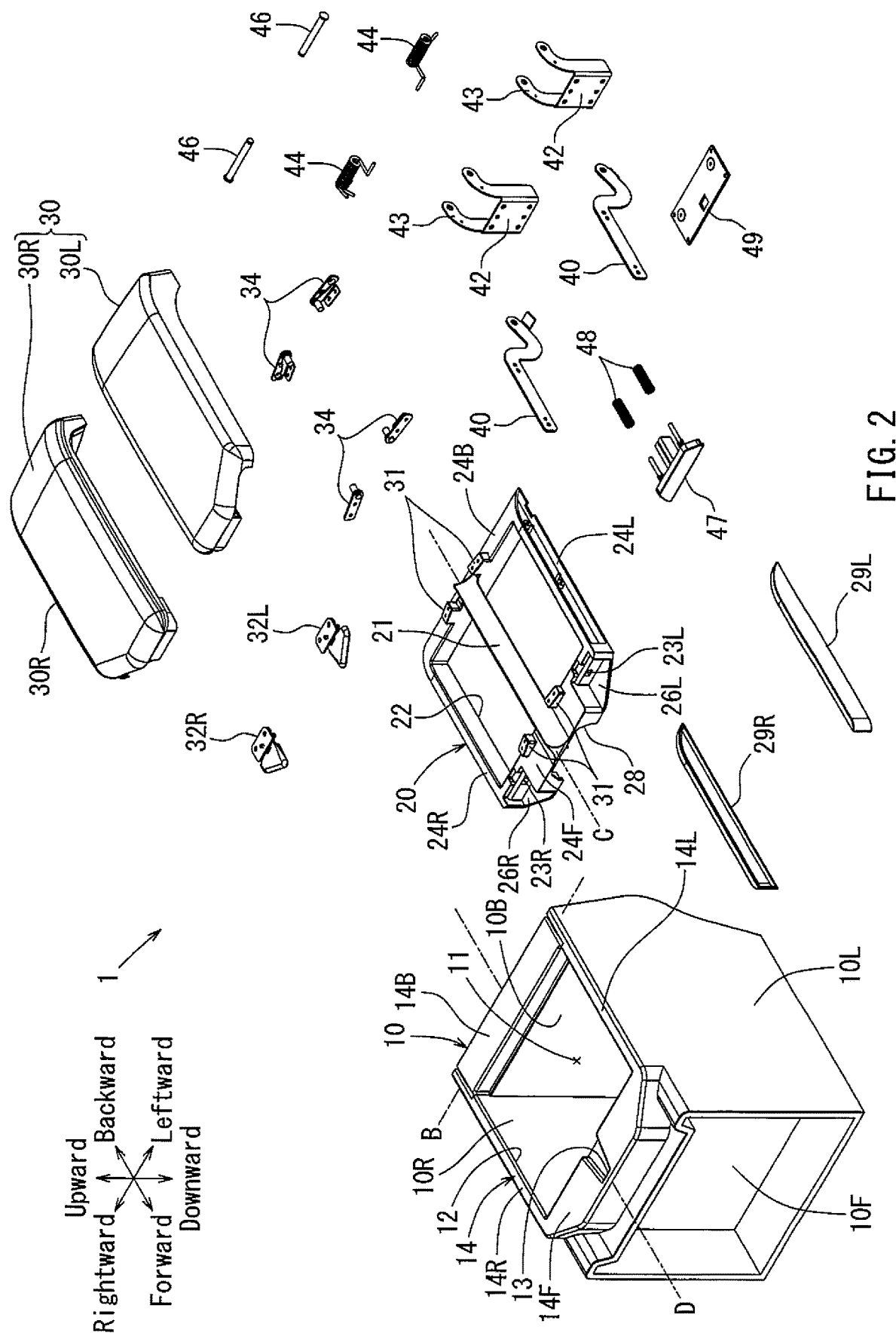
FIG. 2 is an exploded perspective view of the console box.

As shown in FIG. 2, the lid base 20 may be configured to be disposed on the upper edge 14 of the console body 10. The lid base 20 may be formed as a rectangular axisymmetrical frame-shaped member essentially corresponding to the shape of the upper edge 14 of the console body 10. The lid base 20 may have a rectangular base opening 22 substantially corresponding to the shape and size of the console opening 12 of the console body 10. That is, the lid base 20 may be configured to encircle or extend along the console opening 12 of the console body 10. In particular, the lid base 20 may include right and left longitudinal portions 24R and 24L and front and back lateral portions 24F and 24B respectively corresponding to the right and left longitudinal edges 14R and 14L of the right and left walls 10R and 10L and the front and back lateral edges 14F and 14B of the front and back walls 10F and 10B. Further, the lid base 20 may have a longitudinal support (guide) bar 21 extending along a longitudinal axis C positioned between right and left longitudinal portions 24R and 24L and integrally connected to the front and back lateral portions 24F and 24B at both ends. The support bar 21 may define right and left lid member receiving sections on the lid base 20. Further, the lid base 20 may have right and left recesses 26R and 26L formed in an upper surface of front lateral portion 24F thereof. Further, the lid base 20 may have a center recess 28 formed in a lower surface of the front lateral portion 24F.

Figure 5:
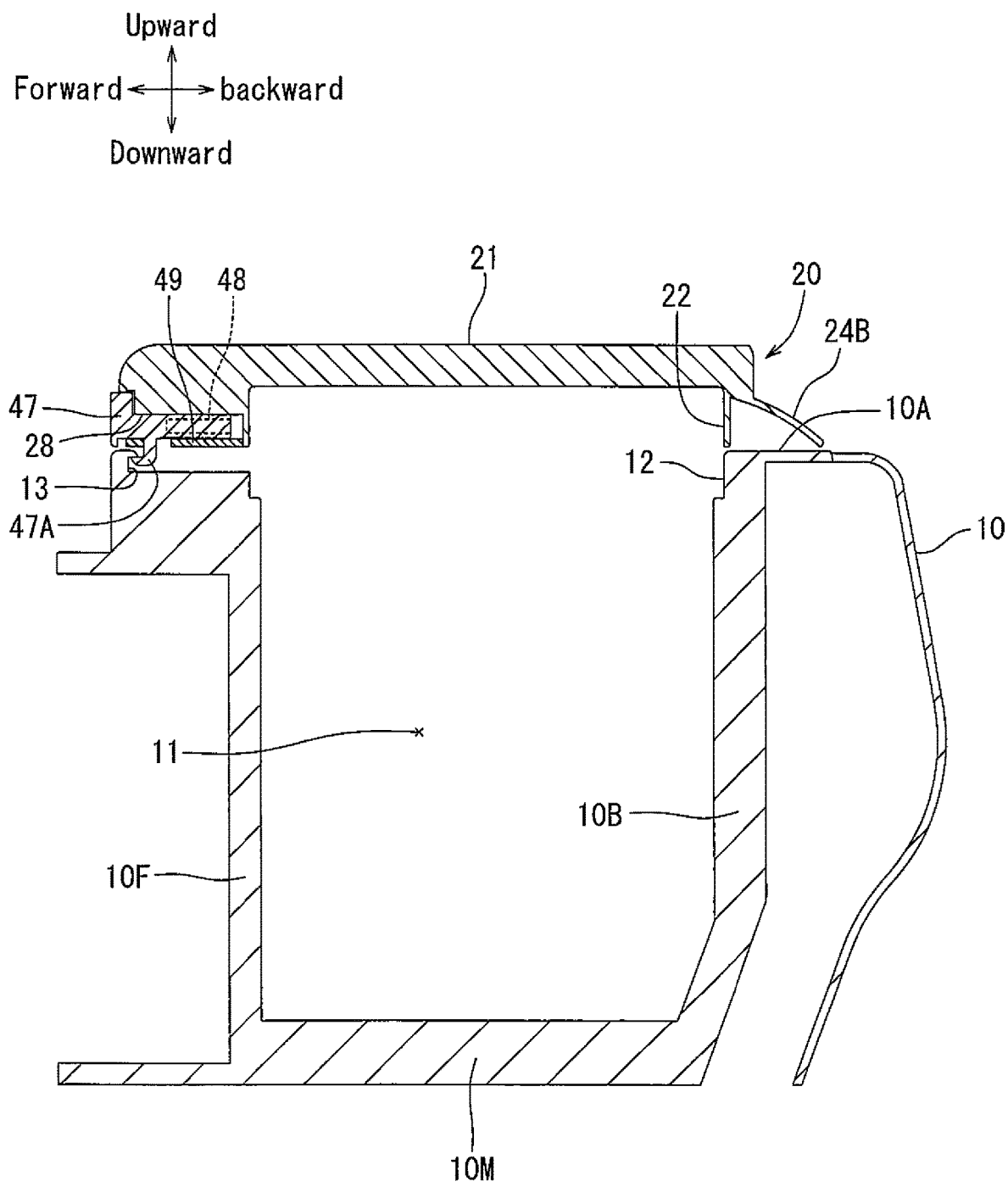
FIG. 5 is a cross-sectional view taken along line V-V in FIG. 1.

As shown in FIG. 5, the lid base 20 may be provided with a hook engagement-type lock device 47 having an engagement hook 47A. The lock device 47 may be received in and secured to the center recess 28 formed in the lid base 20. The lock device 47 may have coil springs 48 attached thereto, so as to normally be biased forward. The lock device 47 may be configured such that the engagement hook 47A can hook on an engagement recess 13 formed in the front lateral edge 14F of the console body 10 when the lid base 20 is positioned on the upper edge 14 of the console body 10. Further, the lid base 20 may have a knob cover 49 that is attached thereto so as to cover the center recess 28 from below.

Figure 3:
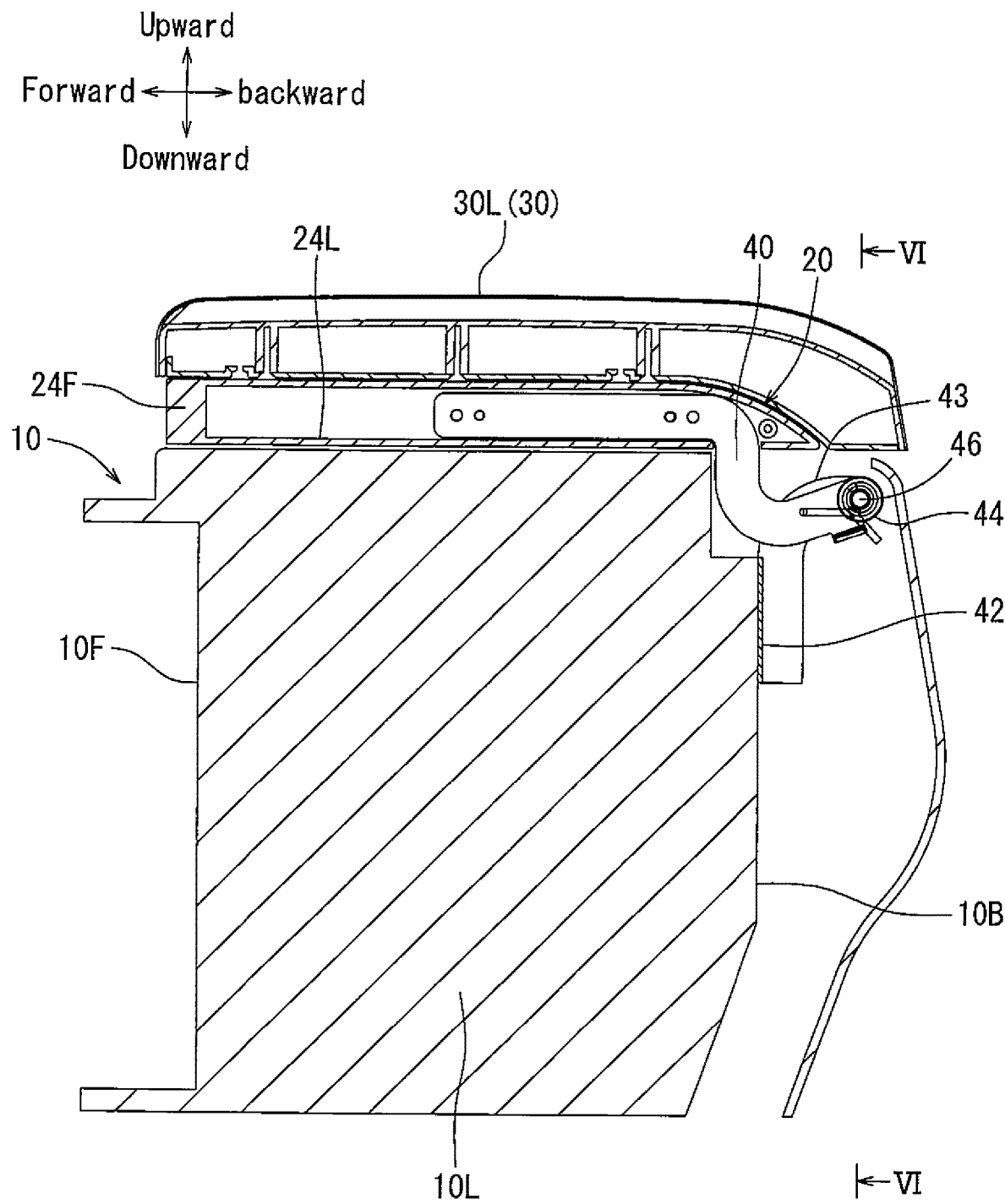
FIG. 3 is a cross-sectional view taken along line III-III in FIG. 1.
Figure 6:
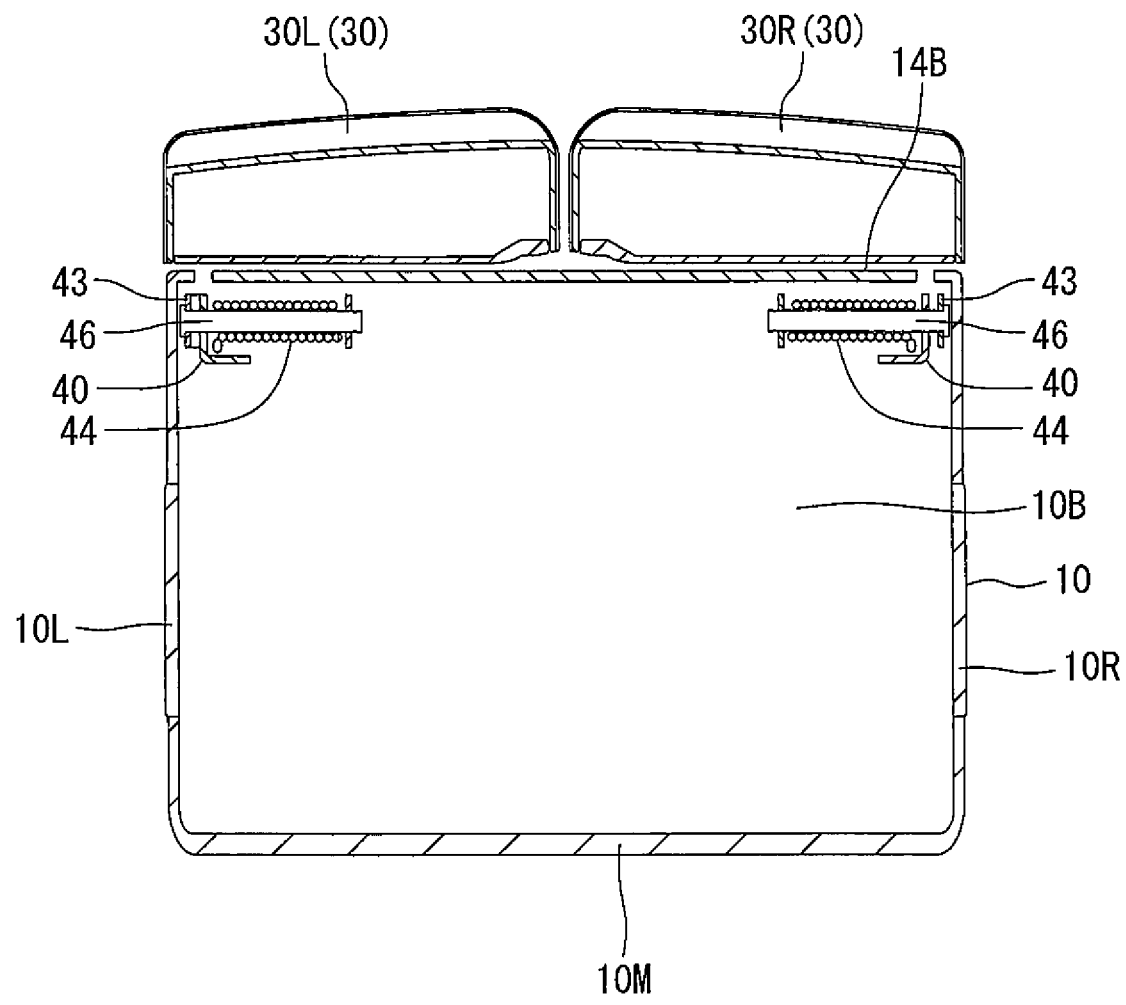
FIG. 6 is a cross-sectional view taken along line VI-VI in FIG. 3.

The lid base 20 thus constructed may be placed on the console body 10 with the rectangular base opening 22 aligned with the console opening 12 of the console body 10. Further, the lid base 20 may be pivotally connected to the console body 10. In particular, as shown in FIGS. 2 and 3, a pair of hinge arms 40 may respectively be attached to right and left longitudinal portions 24R and 24L of the lid base 20. Conversely, as shown in FIGS. 3 and 6, a pair of hinge bases 42 may respectively be attached to the back wall 10B of the console body 10, so as to be positioned adjacent to the back lateral edge 14B of the console body 10. Further, the hinge arms 40 attached to the lid base 20 may respectively be connected to arm portions 43 extending upward from the hinge bases 42 via hinge shafts 46 (which may be referred to as a second hinge unit). Thus, the lid base 20 can be vertically rotatably connected to the console body 10, so as to be vertically rotated about the hinge shafts 46 in a longitudinal direction (back and forth) with respect to the console body 10. That is, the lid base 20 may be positioned on the console body 10, so as to be longitudinally rotated around the back lateral edge 14B of the console body 10. This means that the lid base 20 may be configured to be longitudinally swung around a lateral axis B extending along the back lateral edge 14B of the console body 10. Further, the hinge shafts 46 may respectively have torsion springs 44 attached thereto. The torsion springs 44 attached to the hinge shafts 46 may respectively be configured to rotationally bias the hinge arms 40 upward and backward. As a result, the lid base 20 may normally be rotationally biased longitudinally upward and backward. Further, the right and left longitudinal portions 24R and 24L of the lid base 20 may respectively be covered by right and left end covers 29R and 29L attached thereto. Thus, the hinge arms 40 may be encased within the right and left longitudinal portions 24R and 24L.

Figure 7:
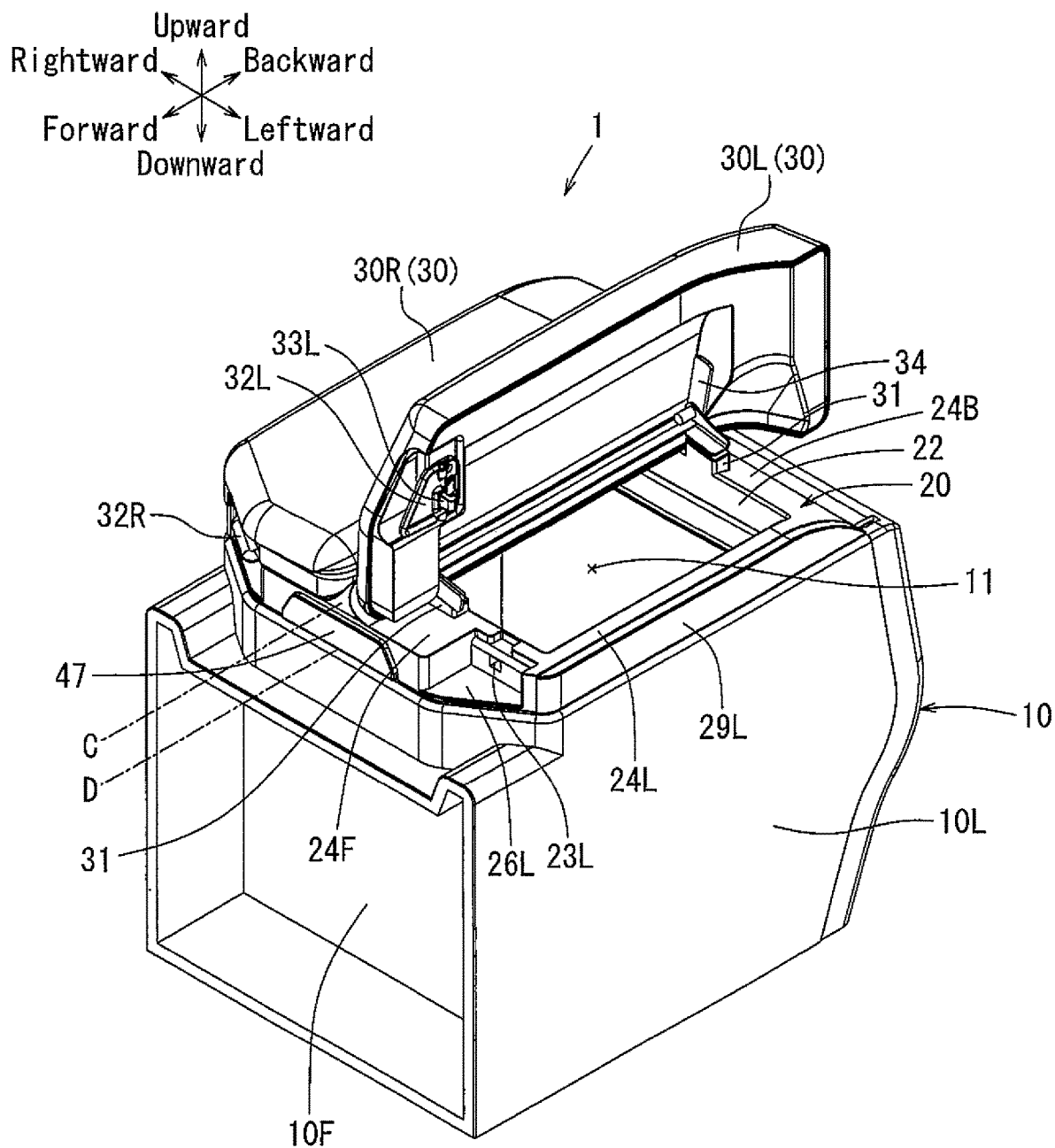
FIG. 7 is a perspective view of the console box in a condition in which one of console lid members (i.e., left console lid member) is opened rightward.

As shown in FIGS. 2, 6 and 7, the console lid 30 may be composed of a pair of right and left lid members 30R and 30L. The right and left lid members 30R and 30L may be configured to close the console opening 12 of the console body 10. In particular, the right and left lid members 30R and 30L may be configured to be positioned on the right and left lid member receiving sections of the lid base 20. That is, the right and left lid members 30R and 30L may be formed as a pair of axisymmetrical members that are respectively configured to conform to the right and left lid member receiving sections of the lid base 20. Further, each of the right and left lid members 30R and 30L may preferably be composed of an inner shell, an outer shell welded to the inner shell and a covering member covering the outer shell from above.

Figure 4:
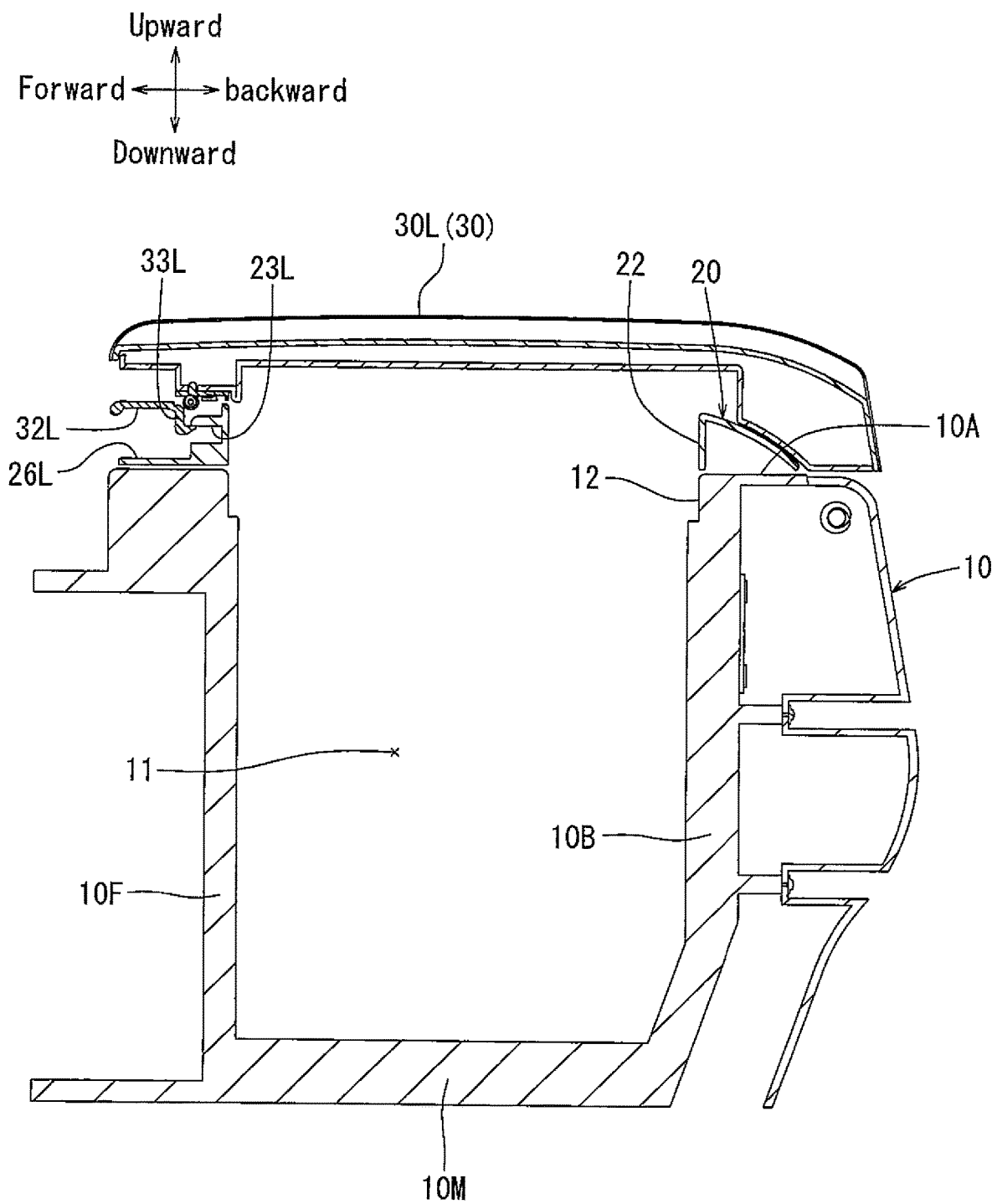
FIG. 4 is a cross-sectional view taken along line IV-IV in FIG. 1.

Further, as shown in FIGS. 1 and 2, the right lid member 30R may be provided with a hook engagement-type lid lock device 32R having an engagement hook (not shown) and connected to the inner shell of the right lid member 30R. The lid lock device 32R may be configured such that the engagement hook can hook on an engagement recess 23R formed in the front lateral portion 24F of the lid base 20 when the right lid member 30R is received in the right lid member receiving section of the lid base 20. Similarly, as shown in FIGS. 1, 2 and 4, the left lid member 30L may be provided with a hook engagement-type lid lock device 32L having an engagement hook 33L and connected to the inner shell of the left lid member 30L. The lid lock device 32L may be configured such that the engagement hook 33L can hook on an engagement recess 23L formed in the front lateral portion 24F of the lid base 20 when the left lid member 30L is positioned on the left lid member receiving section of the lid base 20.

The right and left lid members 30R and 30L thus constructed may respectively be positioned on the right and left lid member receiving sections of the lid base 20. The right and left lid members 30R and 30L thus positioned may respectively be vertically rotatably connected to the lid base 20. In particular, the right lid member 30R may be rotatably connected to a pair of (front and rear) right lid attaching portions 31 separately positioned along the support bar 21 (i.e., the longitudinal axis C) via hinge fittings 34 (which may be referred to as a first hinge unit), so as to be vertically rotated about the hinge fittings 34 in a lateral direction (rightward and leftward) with respect to the lid base 20. That is, the right lid member 30R may be positioned in the right lid member receiving section of the lid base 20, so as to be laterally rotatable around the support bar 21. Conversely, the left lid member 30L may be vertically rotatably connected to a pair of (front and rear) left lid attaching portions 31 separately positioned along the support bar 21 (i.e., the longitudinal axis C) via hinge fittings 34 (which may be referred to as the first hinge unit), so as to be vertically rotated about the hinge fittings 34 in the lateral direction (rightward and leftward) with respect to the lid base 20. That is, the left lid member 30L may be positioned in the left lid member receiving section of the lid base 20, so as to be laterally rotatable around the support bar 21. Thus, the right and left lid members 30R and 30L may respectively be configured to be independently laterally oppositely swung (opened and closed) around the longitudinal axis C positioned between the right and left longitudinal portions 24R and 24L of the lid base 20 and longitudinally passing through the base opening 22 of the lid base 20. This means that the right and left lid members 30R and 30L may respectively be configured to be independently laterally oppositely swung around a longitudinal axis D positioned between the right and left longitudinal edges 14R and 14L of the console body 10 and longitudinally passing through the console opening 12 of the console body 10. Further, torque hinge fittings may preferably be used as the hinge fittings 34. Also, spring biased hinge pins may be used as the hinge fittings 34.

Figure 8:
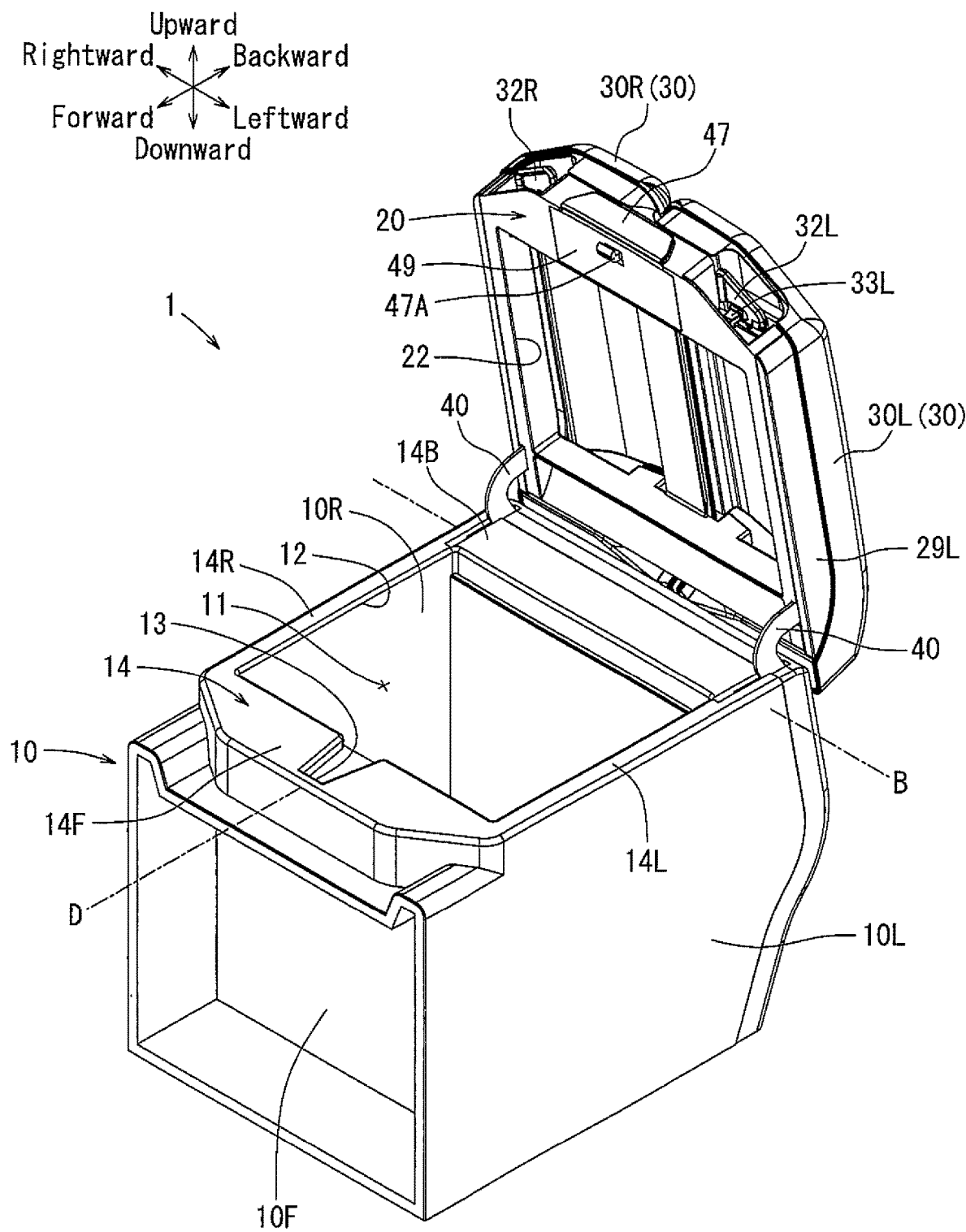
FIG. 8 is a perspective view of the console box in a condition in which both of the console lid members are opened backward along with a lid base.

Next, an opening and closing operation of the console lid 30 (the right and left lid members 30R and 30L) will now be described with reference to FIGS. 7 and 8.

In a lid-closed condition (FIG. 1), the lid base 20 may be disposed on the upper edge 14 of the console body 10 while the engagement hook 47A of the lock device 47 hooks on the engagement recess 13 formed in the console body 10. Thus, the lid base 20 may be held in a locked condition. Conversely, the right lid member 30R may be received in the right lid member receiving section of the lid base 20 while the engagement hook (not shown) of the lid lock device 32R hooks on the engagement recess 23R formed in the right lid member receiving section of the lid base 20. Thus, the right lid member 30R may be held in a locked condition. Similarly, the left lid member 30L may be received in the left lid member receiving section of the lid base 20 while the engagement hook 33L of the lid lock device 32L hooks on the engagement recess 23L formed in the left lid member receiving section of the lid base 20. Thus, the left lid member 30L may be held in a locked condition.

First, in order to open the left lid member 30L of the console lid 30 in the lid closed condition, the lid lock device 32L may be manipulated so as to disengage the engagement hook 33L of the lid lock device 32L from the engagement recess 23L formed in the lid base 20. As a result, the left lid member 30L can be unlocked. Thereafter, the left lid member 30L may be lifted up with the lid lock device 32L continuously manipulated. As a result, as shown in FIG. 7, the left lid member 30L may be swung rightward about its pivot axis (which may be referred to as a first pivot axis) via the hinge fittings 34 linked to the left lid attaching portions 31. That is, the left lid members 30L may be swung rightward (inward) around the longitudinal axis C positioned between the right and left longitudinal portions 24R and 24L of the lid base 20. Thus, a left half of the base opening 22 of the lid base 20 may be opened. As a result, a left half of the console opening 12 of the console body 10 may be opened, which allows access thereto.

Next, in order to open the right lid member 30R of the console lid 30 in the lid closed condition, the lid lock device 32R may be manipulated so as to disengage the engagement hook (not shown) of the lid lock device 32R from the engagement recess 23R formed in the lid base 20. As a result, the right lid member 30R can be unlocked. Thereafter, the right lid member 30R may be lifted up with the lid lock device 32R continuously manipulated. As a result, the right lid member 30R may be swung leftward about its pivot axis (which may be referred to as a second pivot axis) via the hinge fittings 34 linked to the right lid attaching portions 31. That is, the right lid members 30R may be swung leftward (inward) around the longitudinal axis C. Thus, a right half of the base opening 22 of the lid base 20 may be opened. As a result, a right half of the console opening 12 of the console body 10 may be opened, which allows access thereto.

Further, in order to open both of the right and left lid members 30R and 30L (the console lid 30) in the lid closed condition, the lock device 47 of the lid base 20 may be manipulated or pushed so as to disengage the engagement hook 47A of the lock device 47 from the engagement recess 13 formed in the console body 10. As a result, the lid base 20 may be unlocked. In this unlocked state, the lid base 20 may be automatically swung backward about its pivot axis (which may be referred to as a third pivot axis) via the hinge shafts 46 due to a spring force of the torsion springs 44 attached to the hinge shafts 46. That is, the lid base 20 may be swung backward around the lateral axis B of the console body 10. As a result, the right and left lid members 30R and 30L may be simultaneously swung backward with the lid base 20 (FIG. 8). Thus, the console opening 12 of the console body 10 may be fully opened.

According to the console box 1 thus constructed, for example, in order to open the left half of the console opening 12 of the console body 10, the left lid members 30L is swung rightward (inward) around the longitudinal axis C positioned between the right and left longitudinal portions 24R and 24L of the lid base 20. Thus, only a portion of the console opening 12 of the console body 10 can be opened, for example by half. At this time, the opened left lid member 30L is positioned on a laterally intermediate position of the lid base 20 (FIG. 7). In other words, the opened left lid member 30L is positioned on a laterally intermediate position of the console opening 12 (the cavity 11) of the console body 10. Therefore, the opened left lid member 30L does not interfere with accessibility to the console opening 12 of the console body 10. Further, the opened left lid member 30L does not decrease visibility into the cavity 11 of the console body 10.

Further, according to the console box 1, in order to fully open the console opening 12 of the console body 10, the lid base 20 is swung backward around the lateral axis B extending along the back lateral edge 14B of the console body 10. As a result, the right and left lid members 30R and 30L (the console lid 30) are simultaneously swung backward with the lid base 20. Thus, the console opening 12 of the console body 10 can be fully opened with a single swinging action. Therefore, the console opening 12 of the console body 10 can be fully opened easily. Further, when the console opening 12 of the console body 10 is fully opened, the console lid 30 and the lid base 20 swung backward are positioned on the back lateral edge 14B of the console body 10. Therefore, the opened console lid 30 and the lid base 20 do not interfere with accessibility to the console opening 12. Also, the opened console lid 30 and the lid base 20 do not decrease visibility into the cavity 11 of the console body 10.

Various changes and modifications may be made to the present embodiment without departing from the scope of the disclosure. For example, in the embodiment, "a hook engagement-type lock device having an engagement hook" is used as each of the lid lock devices 32R and 32L. However, "a magnetic engagement-type lock device having a magnet" may be used as each of the lid lock devices 32R and 32L. As will be recognized, in such a case, the front lateral portion 24F of the lid base 20 may be provided with a magnet instead of each of the engagement recesses 23R and 23L. Similarly, "a magnetic engagement-type lock device having a magnet" may be used as the lock device 47. In such a case, the front lateral edge 14F of the console body 10 may be provided with a magnet instead of the engagement recess 13. Further, each of the lid lock devices 32R and 32L and the lock device 47 may be omitted as desired.

Further, in the embodiment, "a frame-shaped member" is used as the lid base 20. However, an H-shaped member or a T-shaped member may be used as the lid base 20 as desired.

A representative example of the present disclosure has been described in detail with reference to the attached drawings. This detailed description is merely intended to teach a person of skill in the art further details for practicing preferred aspects of the present disclosure and is not intended to limit the scope of the disclosure. Only the claims define the scope of the claimed disclosure. Therefore, combinations of features and steps disclosed in the foregoing detailed description may not be necessary to practice the disclosure in the broadest sense, and are instead taught merely to particularly describe detailed representative examples of the disclosure. Moreover, the various features taught in this specification may be combined in ways that are not specifically enumerated in order to obtain additional useful embodiments of the present disclosure.

What is claimed is:

1. A console box configured to be installed between right and left seats, comprising:
   a console body having a storage portion in which articles can be stored and a console opening through which the articles can be put in and taken out of the storage portion;
   a pair of right and left lid members configured to close the console opening of the console body;
   a frame-shaped member positioned between the pair of right and left lid members and the console body and configured to encircle the console opening of the console body;
   a first hinge unit that allows the right and left lid members to be respectively independently opened and closed around an axis positioned above and longitudinally extending along the console opening of the console body; and
   a second hinge unit that allowed the frame-shape member to be opened and closed around an axis laterally extending along the console opening of the console body,
   wherein the pair of right and left lid members are respectively connected to the frame shaped member via the first hinge unit, and
   wherein the frame-shape member is connected to the console body via the second hinge unit.

* * * * *